United States Patent [19]

Yatsu et al.

[11] 4,107,418
[45] Aug. 15, 1978

[54] PROCESS FOR PREPARING COPOLYMERS

[75] Inventors: Tadao Yatsu; Hiroshi Wakumoto, both of Iwakuni, Japan

[73] Assignee: Mitsui Petrochemical Industries Ltd., Tokyo, Japan

[21] Appl. No.: 722,499

[22] Filed: Sep. 13, 1976

[30] Foreign Application Priority Data

Sep. 18, 1975 [JP] Japan .............................. 50-112170

[51] Int. Cl.$^2$ .......................... C08F 4/28; C08F 4/32; C08F 4/34; C08F 4/36
[52] U.S. Cl. ................................. 526/184; 526/185; 526/189; 526/227; 526/303; 526/308; 526/328; 526/329; 526/342; 526/346
[58] Field of Search ........................................ 526/184

[56] References Cited

U.S. PATENT DOCUMENTS

| | | | |
|---|---|---|---|
| 3,629,215 | 12/1971 | Nakaguchi et al. | 526/184 |
| 3,637,611 | 1/1972 | Takeya et al. | 526/184 |
| 3,671,492 | 6/1972 | Nakaguchi et al. | 526/184 |

FOREIGN PATENT DOCUMENTS

2,011,843  10/1970  Fed. Rep. of Germany ........... 526/184

*Primary Examiner*—William F. Hamrock
*Attorney, Agent, or Firm*—Sherman & Shalloway

[57] ABSTRACT

An improved process for copolymerizing the monomers (a) at least one monomer selected from the group consisting of monoolefins, non-conjugated polyenes, conjugated polyenes, haloolefins, unsaturated esters of carboxylic acids and unsaturated ethers and (b) an acrylic monomer under slurry polymerization conditions to give a copolymer containing the monomeric units (a) and (b) alternately connected to each other with good regularity which has a narrow molecular weight distribution and is not liable to gelling during its formation.

4 Claims, No Drawings

PROCESS FOR PREPARING COPOLYMERS

This invention relates to a process for preparing a copolymer which comprises copolymerizing (a) at least one monomer selected from olefins, polyenes, unsaturated esters of carboxylic acid and unsaturated ethers with (b) an acrylic monomer in the presence of a catalyst in a poor solvent for the copolymer to be formed. More specifically, the invention relates to an improved process for copolymerizing the monomers (a) and (b) under slurry polymerization conditions to give a copolymer containing the monomeric units (a) and (b) alternately connected to each other with good regularity which has a narrow molecular weight distribution and is not liable to gelling during its formation. This process improves the activity of the catalyst, and markedly increases the yield of the copolymer per unit weight of the catalyst. Furthermore, the polymerizing and post-treating operations have been simplified.

Some prior suggestions are known with regard to a process for producing a copolymer which comprises copolymerizing (a) at least one monomer selected from the group consisting of monoolefins, non-conjugated polyenes, conjugated polyenes, haloolefins, unsaturated esters of carboxylic acids and unsaturated ethers with (b) an acrylic monomer of the following formula

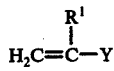

wherein $R^1$ is a member selected from the group consisting of a hydrogen atom, a halogen atom, a cyanide group and alkyl groups and Y is a member selected from the group consisting of —CN, —COR$^2$, —COOR$^3$ and —CONR$^4$R$^5$, in which each of $R^2$, $R^4$ and $R^5$ is a hydrogen atom or an alkyl group and $R^3$ is an alkyl group or a monovalent metal, in a solvent in the presence of a catalyst composed of (A) a component selected from the group consisting of (i) organoaluminum halides of the following formula

wherein $R^6$ represents an alkyl group, X is a halogen atom, and $n$ is a number of more than 0 but less than 3, and (ii) complexes formed between the halides (i) and organic polar compounds, and (B) an organic peroxide. These suggestions are disclosed, for example, in Japanese Patent Publication No. 9950/70 published on Aug. 10, 1970, Japanese Laid-Open Patent Publiction No. 124190/74 published on Nov. 27, 1974, Japanese Laid Open Patent Publication No. 125491/74 published on Nov. 30, 1974, Japanese Laid-Open Patent Publication No. 44282/75 published on Apr. 21, 1975, and Japanese Laid-Open Patent Publication No. 72988/75 published on June 16, 1975. In these Patent Publications, poor solvents for the copolymers are exemplified together with solvents for use as a copolymerization reaction medium. However, none of these Patent Publications disclose that the copolymerization reactions are carried out under slurry polymerization conditions, but in all of these suggestions, the reaction is carried out under solution polymerization or so-called precipitation polymerization conditions. Since the copolymer formed is soluble in the starting monomer or monomeric mixture, the reaction advances as solution polymerization even when a poor solvent for the copolymer is used, thus causing a marked increase in the viscosity of the system as the copolymerization proceeds. Or the reaction advances under conditions of precipitation polymerization which result in the precipitation of the resulting copolymer onto the reactor walls or stirring device, etc. in the agglomerated and adhered state. For this reason, the desired copolymer must be recovered by subjecting the reaction mixture after the reaction to complicated separating procedures, for example, by adding a large amount of a poor solvent such as lower alcohols to precipitate the polymer, or by first dissolving the copolymer agglomerated and adhered to the reactor using a solvent and then adding a large amount of a poor solvent to precipitate the copolymer.

The prior suggestions neither disclose the performance of the reaction under slurry polymerization conditions, nor do they disclose or suggest that copolymerization can be carried out under slurry polymerization conditions or the copolymerization under slurry conditions brings about improvement.

We have extensively investigated copolymerization reactions of the above-mentioned monomers (a) and (b) in the presence of catalyst. As a result, we have found that the copolymerization can be carried out under slurry polymerization conditions by adding the monomers (a) and (b) in such a way that they remain unrected in the reaction system in specified amounts, and also adding one or both of the catalyst components (A) and (B). Under these slurry polymerization conditions, the copolymerization reaction can be carried out in the very stable state. Thus, the resulting copolymer is afloat as fine particles in the polymerization system, and even when the copolymerization progresses, it only results in the increased number of copolymer particles or the increased particle sizes of the individual particles. The copolymerization reaction can be continued without changing to a so-called precipitation polymerization in which the agglomeration and adhesion of the resulting polymer occur. It has been found that the yield of the final polymer per unit amount of the catalyst can be greatly increased probably because the resulting copolymer particles are dispersed uniformly in the polymerization system. We have further found unexpectedly that at the same time, the alternate arrangement of monomer units in the resulting copolymer is repeated regularly to decrease the tendency to the formation of a random copolymer, and the copolymer has a narrower distribution of molecular weight. The process of the invention offers further advantages in that the formation of gelled copolymers can be substantially avoided, and the polymerization operation and other post-treating operations such as separation can be greatly simplified and are easier to perform.

It is an object of this invention therefore to provide an improved, commercially advantageous process for preparing copolymers which comprises copolymerizing the monomers (a) and (b) in a poor solvent for the resulting copolymer in the presence of a catalyst composed of the catalyst components (A) and (B).

The above and other objects and advantages of the present invention will become more apparent from the following description.

According to the process of this invention the monomers (a) and (b) are copolymerized in a poor solvent for the resulting copolymer in the presence of a catalyst composed of the catalyst components (A) and (B), while (I) adding the monomers (a) and (b) to the reaction system so that the total amount of the monomers (a) and (b) remaining unreacted in the reaction system is sufficient to maintain the system in the slurried state under the reaction conditions, and (II) adding either one or both of the catalyst components (A) and (B) to the reaction system. The monomers (a) and (b) and the catalyst components (A) and (B) may be added in small portions continuously or intermittently so as to meet the conditions (I) and (II) above. The manner of addition is properly selected according, for example, to the types of monomers (a) and (b), the types of catalyst components (A) and (B), the reaction temperature, the stirring conditions, and the type of the poor solvent. The monomers (a) and (b) are added, however, under conditions which maintain the reaction system in the slurried state. Where the proportion of the poor solvent is extremely high, the resulting copolymer can be rendered afloat as fine particles even when the monomers (a) and (b) are added at the same time. In such a case, however, the amount of the poor solvent required is too large to be commercially feasible.

According to the present invention, the amount of the poor solvent can be drastically reduced by continuously adding monomers (a) and (b) in portions and adding a fresh supply of the monomers in amounts which substantially correspond to the amounts of the monomers which have been converted to the copolymer.

Furthermore, by continuously adding one or both of catalyst components (A) and (B), the amount of the active seed of copolymerization generated in the reaction system is maintained constant thereby to render the rate of conversion of the monomers to the copolymer constant and increase the rate of polymerization throughout the entire period of polymerization.

In order to maintain the copolymerization reaction system in the slurried state where the copolymer particles obtained are dispesed uniformly, it is first of all necessary that the resulting particles should not agglomerate nor adhere, and the concentration of a solvent for the copolymer should be sufficiently low, and the concentration of the poor solvent, be sufficiently high, to maintain the copolymer particulate. Secondarily, it is necessary that a proper degree of stirring should be applied to the system so as to prevent the sedimentation of the particles.

As regards the first requirement, saturated hydrocarbon compounds can be used as the poor solvent, and the monomers and alcohol compounds added for removing the catalyst residues may act as the solvent. The amounts of monomers (a) and (b) as the solvent must therefore be considered in the present invention. The allowable range of the total amount of the unreacted monomers (a) and (b) present in the reaction system is determined by varying the copolymerization conditions and measuring the monomer concentrations in the system until the slurry copolymerization system changes to a precipitation copolymerization system. For practical purposes, the total amount of the unreacted monomers (a) and (b) can be easily predetermined experimentally by preparing solutions of the monomers having known concentrations according to the types of the monomers (a) and (b) and the reaction conditons employed, suspending test copolymer particles in the solutions, and observing the dissolving behavior of these particles. Preferably, the copolymerization reaction is carried out by adding the monmers (a) and (b) while the reaction system is maintained in the slurried state under conditions such that the total amount of the unreacted monomers (a) and (b) in the reaction system is not more than about 2.5 moles per liter of the poor solvent.

The molar ratio of monomer (a) to monomer (b) is preferably 1 : about 0.2–5, and each of monomers (a) and (b) may consist of at least one species.

The amount of the poor solvent is preferably about 0.5 to about 100 times, more preferably about 1 to about 50 times, the total amount of the monomers (a) and (b).

The reaction temperature is preferably from about $-78°$ C to about 70° C, more preferably from about $-20°$ C to about 70° C, especially preferably from about 0° C to a point about 10° C higher than the glass transition point (Tg) of the resulting copolymer. There is no special restriction on the reaction pressure so long as the reaction system can be maintained in the slurried state, and it is generally about 1 to 100 kg/cm$^2$.

In the process of this invention, the amounts of the monomers (a) and (b) and the rate of addition should preferably be adjusted so that the total amount of the monomers (a) and (b) remaining unreacted in the reaction system is not more than about 2.5 moles per liter of the poor solvent used.

In order to meet the condition (II), the catalyst component (A) in its entirety is first placed in the reaction zone, and the catalyst compoent (B) is added in small portions either continuously or intermittently. Alternatively, the catalyst component (B) in its entirety is placed in the reaction zone, and then the catalyst component (A) is added in small portions either continuously or intermittently. Or, the catalyst components (A) and (B) may be separately added in small portions.

In the process of this invention, the copolymerization is carried out while adding the monomers (a) and (b) and the catalyst components (A) and/or (B) so as to meet the requirements (I) and (II). If all of the monomers (a) and (b) are first charged, and then reacted while gradually adding the catalyst components (A) and (B), the copolymer formed at the early stage immediately dissolves in the monomers, and therefore, the reaction cannot be performed in the slurried state.

Examples of the poor solvent used for the copolymerization include aliphatic or alicyclic saturated hydrocarbons, such as propane, butane, pentane, hexane, heptane, octane, cyclopentane, cyclohexane, and methyl cyclohexane, and mixtures of aliphatic and alicyclic saturated hydrocarbons such as petroleum ether, ligroin, kerosene and light oil. These hydrocarbons are liquid at the reaction pressures and have a boiling point of not more than 220° C at normal atmospheric pressure. In addition to the monomers (a) and (b), a solvent for the polymer may be added in amounts which can maintain the resulting polymer in the suspended state. The poor solvent can be used also as a solvent for the preparation of a complex (ii) from the organoaluminum halide (i) and the organic polar compound.

The copolymerization can be carried out in a single reaction tank, or in a plurality of reaction tanks connected in series. Furthermore, the reaction can be carried out continuously while adding the monomers (a) and (b) and the catalyst components (A) and/or (B) on one hand, and withdrawing a suspension of the resulting copolymerization product continuously from the reaction zone on the other, under the conditions (I) and (II).

As stated above, in the process of this invention, the reaction system is maintained under slurry copolymerization conditions by performing the reaction so that the unreacted monomers (a) and (b) which act as a solvent for the resulting copolymer are not present in excess in the reaction system. According to the type of the resulting copolymer, its solubility in a mixture of the unreacted monomers and the poor solvent can vary. The amounts of the unreacted monomers in the reaction system can vary depending not only upon the amounts of the monomers added to the reaction system and the rate of addition, but upon the rate of copolymerization (i.e., the rate of consumption of the monomers). Hence, the reaction is carried out under the slurry copolymerization conditions by properly choosing a combination of the conditions (I) and (II).

For example, in the case of a combination of an aliphatic monoolefin (a) and the monomer (b), the reaction should preferably be carried out while adding the monomers so that the total amount of the unreacted monomers will become not more than about 2.5 moles, preferably not more than about 1.5 moles, especially not more than about 1 mole, per liter of the poor solvent. For other combinations, the preferred total amount of the monomers (a) and (b) remaining unreacted in the reaction system is, for example, not more than about 2.5 moles, especially not more than about 1.5 moles, in the case of a combination of an aromatic monoolefin (a) and the monomer (b); not more than about 2.5 moles, further not more than about 1.2 moles, especially not more than about 0.8 mole, in the case of a combination of a conjugated polyene (a) and the monomer (b); not more than about 2.5 moles, especially not more than about 2 moles, in the case of an unsaturated ester of a carboxylic acid (a) and the monomer (b); not more than about 2.5 moles, further not more than about 2 moles, especially not more than about 1 mole, in the case of a combination of a haloolefin (a) and the monomer (b); and not more than about 2.5 moles, further not more than about 1.2 moles, especially not more than about 0.8 mole, in the case of a combination of an unsaturated ether (a) and the monomer (b), all amounts being per liter of the poor solvent.

When the copolymerization in accordance with this invention is carried out while the total amount of the unreacted monomers (a) and (b) is maintained extremely low (that is, while the amount of the poor solvent is increased exceedingly), the agglomeration and adhesion of the resulting copolymer particles as a result of their contact are certainly reduced, and the stability of the particles increases. On the other hand, however, this causes a decrease in the yield of the copolymer per unit amount of the solvent used, and a slower rate of copolymerization, thus requiring a longer period of polymerization. In order, therefore, to disperse the resulting copolymer in the form of particles and to maintain the practical activity and rate of copolymerization, it is preferred to perform the copolymerization while the total amount of the unreacted monomers (a) and (b) is being maintained as close to the upper limit of the allowable range as possible from the initial to the last stage of the reaction period.

The reaction is preferably carried out with stirring while maintaining the slurry copolymerization system. It is especialy preferred to employ stirring conditions which impart a sufficient stirring action to the reaction system. Stirring is also useful in the process of this invention to prevent the resulting copolymer particles from sedimenting and depositing, and thus from changing the reaction system to a precipitation polymerization system. In actual operation, the stirring action should be of sufficient degree to maintain the resulting copolymer particles in the uniformly dispersed and suspended state in the system throughout the polymerization period. It is difficult to describe this condition more specifically since it varies according, for example, to the shape of the polymerization apparatus and the method of stirring employed. Since it is prefered that the copolymer particles in the system are afloat uniformly, and the chances of collision among the particles are reduced, the stirring should preferably result in maintaining the solution part of the copolymerization system in a state of laminar flow rather than in a state of turbulent flow. When the most common rotating stirring method is employed, the requirement for achieving this state is such that the linear velocity of the solution on the wall surface of the polymerization apparatus is 10 to 500 m/min., preferably 20 to 40 m/min., more preferably 40 to 300 m/min.

Examples of the monomer (a) used in this invention include for example, aliphatic monoolefins containing 2 to 18 carbon atoms such as ethylene, propylene, 1-butene, 2-butene, isobutene, 1-pentene, 1-hexane, 2-methyl-1-pentene, 4-methyl-1-pentene, 1-decene, 1-octadecene, vinyl cyclobutane, vinyl cyclopentane, and vinyl cyclohexene; alicyclic monoolefins containing 5 to 8 carbon atoms such as cyclopentene, cyclohexene and cyclooctene; and aromatic monoolefins containing 8 to 13 carbon atoms such as styrene, α-methylstyrene, α-ethylstyrene, α-propylstyrene, vinyl toluene, vinyl xylene, isopropenyl toluene, vinyl naphthalene and isopropenyl naphthalene; non-conjugated polyenes containing 5 to 10 carbon atoms such as 1,4-pentadiene, 1,5-hexadiene, 1,7-octadiene, 3-chloro-3,7-dimethyl-1,6-octadiene, 4-vinyl-1-cyclohexene, 2,4-dimethyl-4-vinyl-1-cyclohexene, and 1,5-cyclooctadiene; conjugated polyenes containing 4 to 12 carbon atoms such as butadiene, isoprene, 1,3-pentadiene, 1,3-hexadiene, 1,3,5-hexatriene, chloroprene, and 2-phenyl-1,3-hexadiene; haloolefins containing 2 to 10 carbon atoms such as vinyl chloride, allyl chloride, 4-chloro-1-butene, 3-chloro-1-butene, chlorostyrene, 4-chlorovinyl cyclohexane, methallyl chloride, vinylidene chloride, and the corresponding bromides and iodides; unsaturated esters of carboxylic acids containing 3 to 10 carbon atoms such as vinyl formate, vinly acetate, vinyl propionate, vinyl butyrate, vinyl caproate, vinyl benzoate, allyl acetate, allyl propionate, allyl benzoate, ispropenyl acetate, methallyl acetate and 1-butenyl acetate; and unsaturated ethers containing 3 to 10 carbon atoms such as methyl vinyl ether, ethyl vinyl ether, propyl vinyl ether, butyl vinyl ether, methyl allyl ether, ethyl allyl ether, methyl methallyl ether, and ethyl methallyl ether. In the process of this invention, at least two of these monomers may be used simultaneously.

The acrylic monomer (b) used as a comonomer in the process of this invention is expressed by the following formula

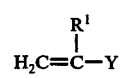

wherein $R^1$ is a member selected from the group consisting of a hydrogen atom, a halogen atom, a cyanide group, alkyl groups preferably containing 1 to 6 carbon atoms, and aryl groups preferably containing 6 to 12 carbon atoms; and Y is a member selected from the group consisting of —CN, —$COR_2$, —$COOR_3$ and —$CONR^4R^5$, in which each of $R^2$, $R^4$ and $R^5$ is a hydrogen atom, an alkyl group preferably containing 1 to 4 carbon atoms, an aryl group preferably containing 6 to 12 carbon atoms, or a cycloalkyl group preferably containing 6 to 12 carbon atoms, and $R_3$ is an alkyl group preferably containing 1 to 18 carbon atoms, an aryl group preferably containing 6 to 12 carbon atoms, a cycloalkyl group preferably containing 6 to 12 carbon atoms, or a monovalent metal such as lithium, sodium or potassium.

Examples of the monomer (b) include acrylic acid esters containing 4 to 22 carbon atoms such as methyl acrylate, ethyl acrylate, propyl acrylate, butyl acrylate, amyl acrylate, hexyl acrylate, octadecyl acrylate, allyl acrylate, tolyl acrylate, phenyl acrylate, benzyl acrylate, cyclohexyl acrylate, and 2-chloroethyl acrylate; esters of α-substituted acrylic acids containing 5 to 23 carbon atoms such as methyl methacrylate, ethyl methacrylate, propyl methacrylate, butyl methacrylate, amyl methacrylate, octadecyl methacrylate, benzyl methacrylate, phenyl methacrylate, tolyl methacrylate, cyclohexyl methacrylate, 2-chloroethyl methacrylat, methyl α-ethylacrylate, ethyl α-ethylacrylate, methyl α-n-propylacrylate, methyl α-n-butylacrylate, methyl atropate, and methyl α-chloromethylacryate; unsaturated nitriles containing 3 to 5 carbon atoms such as acrylonitrile, methacrylonitrile, and vinylidene cyanide; alkali metal salts of acrylic acid or α-substituted acrylic acids containing 3 to 5 carbon atoms such as lithium acrylate, sodium acrylate, potassium acrylate, lithium methacrylate, sodium methacrylate, and potassium methacrylate; unsaturated ketones containing 4 to 10 carbon atoms, such as methyl vinyl ketone, ethyl vinyl ketone, phenyl vinyl ketone and methyl isopropenyl ketone; and unsaturated amides containing 3 to 11 carbon atoms such as acrylamide, N-methyl acrylamide, N,N-dimethyl acrylamide, N-butyl acrylamide, and methacrylamide. Of the monomers (b) illustrated above, the acrylate esters have especially high polymerization activity.

The catalyst used in the process of this invention is composed of (A) a component selected from the group consisting of (i) organolauminum halides of the following formula

$$AlR_n^6X_{3-n}$$

wherein $R^6$ is an alkyl, alkenyl, aryl, aralkyl or cycloalkyl group, preferably an alkyl group containing 1 to 12 carbon atoms, an aryl group containing 6 to 12 carbon atoms, and a cycloalkyl group containing 6 to 12 carbon atoms; X is a halogen atom; and n is a number of more than 0 but less than 3, and (ii) complexes formed between said halides (i) and organic polar compounds, and (B) an organic peroxide.

The organic aluminum halide (i) is either a single compound such as $AlR^6X_2$, $AlR_2^6X$ or $AlR_{1.5}^6X_{1.5}$ or a mixture of at least two compounds selected from $R_3^6Al$, $AlR^6X_2$, $AlR_2^6X$, $AlR_{1.5}^6X_{1.5}$ and $AlX_3$. In these formulae, n represents any number between 0 and 3, preferably $1 \leqq n \leqq 2$. $R^6$ represents an alkyl, alkenyl, aryl, aralkyl or cycloalkyl group containing 1 to 12 carbon atoms. Specific examples of $R^6$ are alkyl groups such as methyl, ethyl, propyl, butyl, hexydl, decyl and dodecyl, alkenyl groups such as allyl, aryl groups such as phenyl and tolyl, aralkyl groups such as benzyl, and cycloalkyl groups such as cyclohexyl. X represents chlorine, bromine, iodine and fluorine.

Specific examples of the organoaluminum halide (i) include alkylaluminum halides containing 1 to 12 carbon atoms such as methylaluminum dichloride, ethylaluminum dichloride, propylaluminum dichloride, butylaluminum dichloride, hexylaluminum dichloride, dodecyaluminum dichloride, methylaluminum dibromide, ethylaluminum dibromide, propylaluminum dibromide, butylaluminum dibromide, methylaluminum sesquichloride, ethylaluminum sesquichloride, propylaluminum sesquichloride, butylaluminum sesquichloride, hexylaluminum sesquichloride, dimethylaluminum chloride, diethylaluminum chloride, dipropylaluminum chloride, dibutylaluminum chloride and dihexylaluminum chloride; alkenylaluminum halides containing 3 to 12 carbon atoms such as allylaluminum dichloride, allylaluminum dibromide and diallylaluminum chloride; arylaluminum halides containing 6 to 12 carbon atoms such as phenylaluminum dichloride and diphenylaluminum chloride, and the corresponding bromides, iodides and fluorides; cycloalkylaluminum halides containing 6 to 12 carbon atoms, such as cyclohexylaluminum dichloride; aralkylaluminum halides containing 8 to 12 carbon atoms such as benzylaluminum dibromide and benzylaluminum sesquichloride; and mixed organoaluminum halides such as a mixture of triethyl aluminum and aluminum chloride, a mixture of tripropyl aluminum and aluminum chloride, a mixture of triethyl aluminum and aluminum bromide, and a mixture of triethyl aluminum and aluminum iodide.

In the process of this invention, the organoaluminum halide (i) may be used alone as the catalyst component (A). But preferably, it is used as a complex (ii) formed between it and a monomer containing a hetero atom (organic polar compound) whih may be either one of the monomers (a) and (b) used in the invention. Complexes of the organoaluminum halides (i) with the acrylic monomers (b) are especially preferred.

In addition to the compounds exemplified hereinabove as the monomer (b), those usable for complex formation also include, for example, esters of unsaturated carboxylic acids containing 6 to 12 carbon atoms such as ethyl atropate, dimethyl maleate, diethyl maleate, dipropyl maleate, dibutyl maleate, dimethyl fumarate, diethyl fumarate, dipropyl fumaraate, dibutyl fumarate, dimethyl itaconate, dimethyl citraconate, and dimethyl tetrahydrophthalate; amides of unsaturated carboxylic acids containing 6 to 12 carbon atoms such as atropamide, maleinamide, N,N-dimethyl maleinamide, N,N,N′,N′-tetramethyl maleinamide, itaconamide, citraconamide, tetrahydrophthalamide and maleinimide; nitriles of unsaturated carboxylic acids containing 6 to 12 carbon atoms such as α-phenyl acrylonitrile, maleonitrile, fumaronitrile, itaconitrile and citraconitrile; anhydrides of unsaturated carboxylic acids containing 5 to 12 carbon atoms such as maleic anhydride, itaconic anhydride, citraconic anhydride and tetrahydrophthalic anhydride; unsaturated esters of carboxylic acids containing 3 to 10 carbon atoms such as vinyl formate, vinyl acetate, vinyl propionate, vinyl butyrate, vinyl valerate, vinyl benzoate, allyl acetate, allyl propionate, allyl butyrate, isopropenyl acetate, methallyl acetate, and 1-butenyl acetate; and unsaturated ethers containing 3 to 10 carbon atoms such as methyl vinyl ether, ethyl vinyl ether, propyl vinyl ether, butyl vinyl ether, methyl allyl ether, ethyl allyl ether, methyl methallyl ether, and ethyl methallyl ether.

Organic polar compounds selected from the monomers (a) and (b) are used either alone or in admixture of two or more. Of these organic polar compounds, the unsaturated carboxylic acid esters; and the unsaturated esters of carboxylic acids are preferred. The use of acrylate esters and methacrylate esters is especially preferred. The amount of the organic polar compound is 1 to 50 moles, preferably 1 to 10 moles, per mole of the organoaluminum halide (i).

In the formation of the comlex (ii), other organic polar compounds (i.e., compounds other than the monomers (a) and (b) may be used. They include, for example, ethers, esters, aromatic ketones, cyclic acid anhydrides, amines, amides, nitriles, thioethers, sulfoxides, and sulfones.

Specific examples of other organic polar compounds are ethers containing 2 to 8 carbon atoms such as diethyl ether, ethyl propyl ether, ethyl butyl ether, ethyl hexyl ether, dipropyl ether, dibutyl ether, anisole, diphenyl ether, methylene glycol dimethyl ether, methylene glycol diethyl ether, ethylene glycol diphenyl ether, trimethylene glycol dimethyl ether, trimethylene glycol diethyl ether, tetramethylene glycol dimethyl ether, pentamethylene glycol dimethyl ether, hexamethylene glycol dimethyl ether and veratrole; cyclic ethers containing 4 to 8 carbon atoms as furan, 2-methylfuran, and benzofuran; aromatic ketones containing 8 to 13 carbon atoms in which at least one aryl group is bonded to the carbonyl group, such as acetophenone, propiophenone, and benzophenone; carboxylic acid esters containing 3 to 18 carbon atoms (excepting those containing a conjugated double bond at the carbonyl group, such as acrylic or methacrylic esters), for example, (1) ethyl formate, butyl formate, methyl acetate, ethyl acetate, propyl acetate, butyl acetate, amyl acetate, hexyl acetate, octyl acetate, decyl acetate, phenyl acetate, benzyl acetate, methyl propionate, ethyl propionate, propyl propionate, butyl propionate, and phenyl propionate, and esters of butyric acid, valeric acid, caproic acid, caprylic acid, benzoic acid, and phenylacetic acid corresponding to the above-exemplified esters, (2) dimethyl oxalate, diethyl oxalate, dimethyl succinate, diethyl succinate, dipropyl succinate, dibutyl succinate, diphenyl succinate, and dibenzyl succinatee, and esters of glutaric acid, adipic acid and phthalic acid corresponding to the above-exemplified esters, (3) methylene glycol diacetate, ethylene glycol diacetate, and ethylene glycol dipropionate, and esters of trimethylene glycol, tetramethylene glycol, pentamethylene glycol and diethylene glycol corresponding to the above-exemplified esters, and (4) lactones such as β-propiolactone, γ-butyrolactone, γ-valerolactone, and ε-caprolactone; carbonate esters containing 3 to 15 carbon atoms such as dimethyl carbonate, diethyl carbonate, dipropyl carbonate, diphenyl carbonate, dibenzyl carbonate and ethylene carbonate; acid anhydrides containing 4 to 8 carbon atoms and having a cyclic structure such as succinic anhydride, glutaric anhydride and phthalic anhydride; nitriles containing 2 to 8 carbon atoms (excepting those containing a conjugated double bond such as acrylonitrile and methacrylonitrile) such as acetonitrile, propionitrile, butyronitrile, valeronitrile, capronitrile, benzonitrile, malononitrile, and glutaronitrile; tertiary amines containing 3 to 12 carbon atoms such as triethylamine, tripropylamine, tributylamine, and N,N,N',N'-tetramethylethylenediamine; amides containing 3 to 12 carbon atoms such as dimethyl formamide; thioethers containing 4 to 12 carbon atoms such as diethyl thioether, dipropyl thioether and dibutyl thioether; sulfoxides containing 4 to 12 carbon atoms such as dimethyl sulfoxide and diphenyl sulfoxide; and sulfones containing 4 to 12 carbon atoms such as diethyl sulfone and thiophene-1,1-dioxide.

These other organic polar compounds can be used either alone or in admixture of two or more. The amount of the other organic polar compound is 1 to 50 moles, preferably 1 to 10 moles, per mole of the organoaluminum halide (i) as in the case of those selected from the monomers (a) and (b).

The complex (ii) can be formed by sufficiently mixing the organoaluminum halide (i) and the organic polar compound at a temperature of about −50° C to about +80° C in a poor solvent used for copolymerization. A preferred mixing procedure involves adding the organoaluminum halide (i) dropwise to a solution of the organic polar compound in solvent, and stirring the mixture for a while after the addition. The complex between these two components is the one in which the lone electron pair of the hetero atom of the organic polar compound is coordinated with the aluminum atom of the organoaluminum halide (i), as confirmed by its nuclear magnetic resonance spectrum.

Formation of a complex (ii) between the organoaluminum halide (i) and an organic polar compound other than the monomers (a) and (b) is effected preferably such that the amount of the organic polar compound to be reacted corresponds to 1 to 50, preferably 1 to 10, ether linkages (in the case of ethers), 1 to 50, preferably 1 to 10, carbonyl groups (in the case of aromatic ketones), 1 to 50, preferably 1 to 10, ester linkages (in the case of carboxylic acid esters), 0.5 to 25, preferably 0.5 to 5 carbonate groups (in the case of carbonate esters), 0.5 to 25, preferably 0.5 to 5, acid anhydride structures (in the case of cyclic acid anhydrides), 1 to 50, preferably 1 to 10, nitrile groups (in the case of nitriles), 1 to 50, preferably 1 to 10, amino groups (in the case of tertiary amines), 1 to 50, preferably 1 to 10, amine linkages (in the case of amides), 1 to 50, preferably 1 to 10, sulfur atoms (in the case of thioethers and sulfoxides), or 1 to 50, preferably 1 to 10, sulfur atoms (in the case of sulfones), all being for each aluminum atom of the organoaluminum halide.

In general radical copolymerizations, the composition of a copolymer is determined by the type of monomers and their proportions charged. The present invention has the advantage that when a complex (ii) formed between the organoaluminum halide (i) and the organic polar compound is used, the composition of the resulting copolymer can be changed by selecting the type of the organic polar compound.

The second catalyst component (B) used together with the component (A) is an organic peroxide. Generally, those having a half life of 1 to 10 hours in decompositions reactions at 50° to 120° C are generally preferred, but useful organic peroxides are not limited to them. Usable organic peroxides include, for example, diacyl peroxides containing 4 to 18 carbon atoms, ketone peroxides containing 4 to 20 carbon atoms, hydroperoxides containing 4 to 10 carbon atoms, dialkyl peroxides containing 8 to 18 carbon atoms, and peroxy esters containing 5 to 15 carbon atoms. Specifically, examples of the diacyl peroxides containing 4 to 18 carbon atoms are acetyl peroxide, propionyl peroxide, isobutyryl peroxide, octanoyl peroxide, decanoyl peroxide, lauroyl peroxide, 3,3,5-trimethylhexanoyl peroxide, benzoyl peroxide, 2,4-dichlorobenzoyl peroxide, di-isopropyl peroxydicarbonate, di-2-ethylhexyl peroxydicarbonate, di-2-ethoxyethyl peroxydicarbonate, and acetyl cyclohexylsulfonyl peroxide; examples of the peroxy esters containing 5 to 15 carbon atoms are tert-butyl peroxyacetate, tertbutyl peroxyisobutyrate, tert-butyl peroxypivalate, tertbutyl peroxyreodecanoate, tert-butyl peroxy-2-ethylhexanoate, tert-butyl peroxy 3,3,5-trimethylhexancate, tert-butyl peroxylaurate, tert-butyl peroxybenzoate, di-tert-butyl diperoxyphthalate, and tert-butyl peroxyisopropylcarbonate; examples of the ketone peroxides containing 4 to 20 carbon atoms are methyl ethyl ketone peroxide and cyclohexanone peroxide; examples of the hydroperoxides containing 4 to 10 carbon atoms are tert-butyl hydroperoxide, cumene hydroperoxide, di-isopropylbenzene hydroperoxide, p-menthane hydroperoxide and 2,5-dimethylhexane 2,5-dihydroperoxide; and examples of the dialkyl peroxides containing 8 to 18 carbon atoms are di-tert-butyl peroxide, tert-butyl cumyl peroxide, di-cumyl peroxide, 2,5-dimethyl-2,5-di(tertbutylperoxy) hexane, and 2,5-dimethyl-2,5-di(tert-butylperoxy) hexyne-3.

Of these peroxides, those containing the group

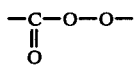

are most preferred.

In the performance of the process of the present invention, the amount of the catalyst component (A) is preferably about 1/1,000,000 to about 1 mole, more preferably about 1/10,000 to about 1/10 mole, calculated as the organoaluminum halide (even in the case of the complex (ii)) per mole of the monomers (a) and (b) combined. The amount of the component (B) is preferably about 1/100 to about 100, more preferably about 1/10 to about 10, per mole of the organoaluminum halide (i) (in the case of the complex (ii), the molar amount is calculated as the organoaluminum haide).

The following examples illustrate the present invention more specifically.

EXAMPLE 1 AND COMPARATIVE EXAMPLE 1

A 2-liter six-necked separable polymerization flask equipped with a vane-type stirring rod connected to a motor controllable as to its rotating speed, a condenser, a thermometer, a stopper cock and two metering pumps was disposed in a constant-temperature tank including a temperature controlling device, and the inside of the flask was thoroughly purged with nitrogen. 1065 ml of n-hexane and 35 millimoles of ethyl acetate were fed to the flask in an atmosphere of nitrogen, mixed, and cooled to 0° C. To the resulting solution was slowly added dropwise 17.5 millimoles of ethylaluminum dichloride with stirring over the course of 5 minutes. After the addition, the mixed solution was allowed to stand for 1 hour with stirring in order to complete the formation of a complex between ethylaluminum dichloride and ethyl acetate. The mixture was then heated to 10° C, and at this temperature, 298.0 g of an equimolar mixture of 4-methyl-1-pentene and methyl acrylate, and 300 ml of a 0.03 mole/liter n-hexane solution of tert-butyl peroxy isobutyrate were fed for 5 hours at fixed rates using the two metering pumps so that the total amount of the two monomers in the reaction system became not more than 2 moles/liter of the solvent. Soon after this feeding began, fine polymer particles were formed and came afloat in the reaction system. These particles gradually increased in number and size with the lapse of time. After the end of addition, the polymerization system was maintained for an additional 15 hours at 10° C with stirring. After the end of polymerization, 200 ml of a 10% by volume n-hexane solution of isopropyl alcohol was added to the reaction mixture to decompose the catalyst. In the stirred state, a great amount of the polymer formed ws dispersed and suspended inthe form of granules in the polymerization system. Mere filtration of the reaction mixture could result in the recovery of the polymer particles. The polymer particles were thoroughly washed with n-hexane, and dried at 30° under reduced pressure to afford 158 g of a 4-methyl-1-pentene/methyl acrylate copolymer.

The copolymer obtained was soluble in chloroform and tetrahydrofuran. According to an analysis of its NMR spectrum measured in a deuterochloroform solvent, the methyl acrylate content of the copolymer was found to be 59 mole%.

The copolymer was subjected to gel permeation chromatography using a tetrahydrofuran solvent, and compared with monodiperse polystyrene of a known weight (a standard sample). It was found that this copolymer had a molecular weight distribution within the range of from 40,000 to 500,000.

For comparison (Comparative Example 1), equimolar amounts of the two monomers were subjected to an ordinary free radical copolymerization at 30° C using acetyl cyclohexylsulfonyl peroxide. The resulting copolymer was similarly examined by NMR spectroscopy, and found to have a methyl acrylate content of 93.5 mole%. It was found therefore that the copolymer obtained in accordance with the process of this invention has a far higher 4-methylpentene content than the copolymer obtained by ordinary free radical copolymerization.

EXAMPLES 2 TO 130

The procedure of Example 1 was repeated except that the types of the monomers (a) and (b), catalyst components (A) and (B), solvent, and the copolymerization conditions were changed as shown in Tables 1 and 2. The results are also shown in Tables 1 and 2.

Unless otherwise specified, the following should be noted hereafter.

The monomer concentrations shown in the tables are the total concentration of the monomers in the reactor at the end of monomer feeding (at the end of 5 hours after the initiation of polymerization) which was determined by gas chromatography. The content of monomer (b) in the resulting copolymer is determined by NMR spectra measured in deuterochloroform. The molecular weight distribution is measured by gel permeation chromatography using tetrahydrofuran.

In each of the following examples, the organic peroxide as catalyst component (B) was used in an amount of 300 ml as a 0.03 mole/liter solution in each of the solvents used for polymerization.

In Examples 107 to 130, the polymerization system was stirred for 2 hours from the end of feeding the monomers to the decomposition of the catalyst with alcohol. The decomposition of the catalyst was performed in the same way as in Example 1 except that 300 ml of a 5% by volume n-hexane solution of isopropyl alcohol was used.

Table

| Examples | | 2 | 3 | 4 | 5 | 6 | 7 |
|---|---|---|---|---|---|---|---|
| Monomers | monomer (a) (g) | α-methyl styrene (207) | vinyl acetate (151) | vinyl acetate (151) | vinyl acetate (151) | vinyl acetate (151) | vinyl acetate (151) |
| | monomer (b) (g) | methyl acrylate (150) | methyl acrylate (150) | methyl acrylate (150) | methyl acrylate (150) | methyl acrylate (150) | methyl acrylate (150) |
| Catalyst Component (A) | organo-aluminum halide (i) (m mole) | $C_2H_5AlCl_2$ (17.5) | $C_2H_5AlCl_2$ (17.5) | $C_2H_5AlCl_2$ (17.5) | $C_2H_5AlCl_2$ (17.5) | $C_2H_5AlCl_2$ (17.5) | $C_2H_5AlCl_2$ (17.5) |
| | organic polar compound (m mole) | n-butyl ether (35) | ethyl acetate (35) | n-butyl ether (35) | methyl benzoate (35) | ethyl carbonate (35) | methyl acrylate (35) |
| Catalyst component (B) | organic peroxide | t-butyl peroxy iso-butylate | t-butyl peroxy iso-butylate | t-butyl peroxy isopropyl-carbonate | t-butyl peroxy isopropyl-carbonate | t-butyl peroxy isopropyl-carbonate | t-butyl peroxy isopropyl-carbonate |
| Solvent (ml) | | n-hexane (1065) | n-hexane (1065) | n-hexane (1065) | n-hexane (1065) | n-hexane (1065) | n-hexane (1065) |
| Copolymerization conditions | temperature (° C.) | 30 | 20 | 30 | 30 | 30 | 20 |
| | monomer concentration (mol/l-solvent) | 0.69 | 0.91 | 0.93 | 0.85 | 0.98 | 1.73 |
| Copolymer formed | yield (g) | 293 | 232* | 229 | 238 | 217 | 152 |
| | content of monomer (b) (mol %) | 50 | 51 | 51 | 50 | 52 | 63 |
| | molecular weight distribution ($\times 10^4$) | 5 – 40 | 3 – 50 | 3 – 50 | 4 – 50 | 3 – 50 | 5 – 60 |

*Soluble in acetone, tetrahydrofuran and chloroform.

Table 2

| Example | Monomers | | Catalyst component (A) | | Catalyst component (B) | Solvent (ml) | Copolymerization conditions | | Copolymer formed | |
|---|---|---|---|---|---|---|---|---|---|---|
| | monomer (a) (g) | monomer (b) (g) | organoaluminum halide (i) (m mol) | organic polar compound (m mol) | organic peroxide | | Temp. (° C.) | monomer concentration (mol/l-solvent) | Yield (g) | content of monomer (b) (mol %) |
| 8 | 4-methyl-1-pentene (148) | methyl acrylate (150) | $C_2H_5AlCl_2$ (17.5) | n-butyl ether (35) | n-butyl peroxy iso-butyrate | n-hexane (1065) | 10 | 1.59 | 163 | 60 |
| 9 | 1-hexene (148) | methyl methacrylate (175) | ditto | ethyl ether (35) | ditto | ditto | 10 | 2.02 | 120 | 67 |
| 10 | ditto (148) | acrylonitrile (98) | ditto | methyl acetate (35) | ditto | ditto | 10 | 2.40 | 70 | 66 |
| 11 | 1,7-octadiene (194) | methyl acrylate (150) | ditto | dimethoxy ethane (17.5) | ditto | dito | 0 | 1.95 | 151 | 57 1* |
| 12 | cyclopentene (123) | ditto (150) | ditto | n-butyl ether (35) | ditto | ditto | 20 | 1.74 | 139 | 58 |
| 13 | styrene (183) | " (150) | " | ethyl acetate (35) | " | " | 30 | 0.84 | 253 | 52 |
| 14 | α-methyl styrene (207) | methyl acrylate (150) | $(C_2H_5)_{1.5}AlCl_{1.5}$ (17.5) | n-butyl ether (35) | t-butyl peroxy iso-butyrate | n-hexane (1065) | 30 | 0.68 | 288 | 50 |
| 15 | " (207) | " (150) | $(C_2H_5)_2AlCl$ (17.5) | " | " | " | 30 | 0.90 | 264 | 50 |
| 16 | " (207) | " (150) | $C_2H_5AlCl_2$ (17.5) | " | propionyl peroxide | " | 30 | 0.79 | 276 | 51 |
| 17 | " (207) | " (150) | $(CH_3)_{1.5}AlCl_{1.5}$ (17.5) | " | t-butyl peroxy iso-butyrate | " | 30 | 1.05 | 250 | 51 |
| 18 | " (207) | " (150) | $(C_6H_{13})_{1.5}AlCl_{1.5}$ (17.5) | " | " | " | 30 | 1.09 | 246 | 52 |
| 19 | " (207) | " (150) | cyclohexyl aluminum sesquichloride (17.5) | " | " | " | 30 | 0.89 | 266 | 50 |
| 20 | " (207) | " (150) | phenyl aluminum sesquichloride (17.5) | " | " | " | 30 | 1.25 | 230 | 54 |
| 21 | " (207) | " (150) | $(C_2H_5)_{1.5}AlBr_{1.5}$ (17.5) | " | " | " | 30 | 1.08 | 247 | 51 |
| 22 | " (207) | " (150) | $C_2H_5AlCl_2$ | " | octanoyl peroxide | " | 30 | 0.76 | 279 | 51 |
| 23 | " (207) | " (150) | " | " | t-butyl peroxy isopropyl carbonate | " | 30 | 0.61 | 295 | 50 |

Table 2-continued

| | Monomers | | Catalyst component (A) | | Catalyst component (B) organic peroxide | Solvent (ml) | Copolymerization conditions | | | Copolymer formed content of monomer (b) (mol %) |
|---|---|---|---|---|---|---|---|---|---|---|
| Example | monomer (a) (g) | monomer (b) (g) | organoaluminum halide (i) (m mol) | organic polar compound (m mol) | | | Temp. (°C.) | monomer concentration (mol/ l-solvent) | Yield (g) | |
| 24 | α-methyl styrene (207) | methyl acrylate (150) | $C_2H_5AlCl_2$ | n-butyl ether (35) | t-butyl peroxy isobutyrate | cyclopentane (1065) | 30 | 0.78 | 277 | 50 |
| 25 | " (207) | " (150) | " | " | " | methyl cyclohexane (1065) | 30 | 0.75 | 281 | 49 |
| 26 | " (207) | " (150) | " | acetophenone (35) | " | n-hexane (1065) | 30 | 0.89 | 266 | 51 |
| 27 | " (207) | " (150) | " | methyl benzoate (35) | " | " | 30 | 0.66 | 290 | 50 |
| 28 | " (207) | " (150) | " | dimethyl carbonate (35) | " | " | 30 | 0.85 | 270 | 51 |
| 29 | " (207) | " (150) | " | dimethyl ethane (17.5) | " | ditto | " | 0.82 | 273 | 51 |
| 30 | " (207) | " (150) | " | dimethyl malonate (17.5) | " | " | 30 | 0.92 | 263 | 49 |
| 31 | α-methyl styrene (207) | ethyl acrylate (175) | " | n-butyl ether (35) | " | " | 20 | 0.99 | 274 | 50 |
| 32 | " (207) | isobutyl acrylate (224) | " | " | " | " | 20 | 1.24 | 278 | 51 |
| 33 | ditto (207) | acrylonitrile (93) | ditto | ditto | ditto | ditto | 30 | 1.26 | 151 | 53 |
| 34 | α-methyl styrene (207) | methyl methacrylate (175) | $C_2H_5AlCl_2$ (17.5) | n-butyl ether (35) | t-butyl peroxy isobutyrate | n-hexane (1065) | 30 | 1.59 | 209 | 52 |
| 35 | isoprene (120) | methyl acrylate (150) | " | γ-butyrolactone (17.5) | " | " | 10 | 1.86 | 127 *2 | 50 |
| 36 | " (120) | methyl methacrylate (175) | " | " | " | " | 10 | 2.03 | 124 | 50 |
| 37 | vinylidene chloride (170) | methyl acrylate (150) | " | ethyl acrylate (35) | " | " | 10 | 1.08 | 221 | 54 |
| 38 | allyl chloride (135) | " (150) | " | " | " | " | 10 | 1.94 | 128 | 61 |
| 39 | vinyl acetate (151) | " (150) | " | ethyl benzoate (35) | t-butyl peroxy isopropyl carbonate | " | 20 | 0.70 | 241 | 50 |
| 40 | " (196) | " (150) | " | " | " | " | 20 | 1.05 | 210 | 47 |
| 41 | " (105) | " (196) | " | " | " | " | 20 | 0.84 | 229 | 58 |
| 42 | " (151) | " (150) | " | anisol (35) | " | " | 20 | 0.96 | 227 | 53 |
| 43 | vinyl acetate (151) | methyl acrylate (150) | $C_2H_5AlCl_2$ (17.5) | diphenyl ether (35) | t-butyl peroxy isopropyl carbonate | n-hexane (1065) | 20 | 1.22 | 196 | 54 |
| 44 | " (151) | " (150) | " | ethyleneglycol dimethyl ether (17.5) | " | " | 20 | 0.82 | 230 | 52 |
| 45 | " (151) | " (150) | " | veratrole (17.5) | " | " | 20 | 0.88 | 225 | 51 |
| 46 | " (151) | " (150) | " | furan (35) | " | " | 20 | 1.23 | 195 | 55 |
| 47 | " (151) | " (150) | " | benzofuran (17.5) | " | " | 20 | 1.07 | 209 | 54 |
| 48 | " (151) | " (150) | " | acetophenone (35) | " | " | 20 | 0.94 | 220 | 52 |
| 49 | " (151) | " (150) | " | benzophenone (35) | " | " | 20 | 1.43 | 178 | 56 |
| 50 | " (151) | " (150) | " | methyl formate | " | " | 20 | 1.07 | 209 | 53 |

Table 2-continued

| | Monomers | | Catalyst component (A) | | Catalyst component (B) organic peroxide | Solvent (ml) | Copolymerization conditions | | | Copolymer formed content of monomer (b) (mol %) |
|---|---|---|---|---|---|---|---|---|---|---|
| Example | monomer (a) (g) | monomer (b) (g) | organoaluminum halide (i) (m mol) | organic polar compound (m mol) | | | Temp. (° C.) | monomer concentration (mol/l-solvent) | Yield (g) | |
| 51 | " (151) | " (150) | " | benzyl propionate (35) | " | " | 20 | 1.22 | 196 | 53 |
| 52 | " (151) | " (150) | " | dimethyl oxalate (35) | " | " | 20 | 0.93 | 221 | 53 |
| 53 | vinyl acetate (151) | methyl acrylate (150) | C$_2$H$_5$AlCl$_2$ (17.5) | dibenzyl succinate (17.5) | t-butyl peroxy isopropyl carbonate | n-hexane (1065) | 20 | 1.13 | 204 | 54 |
| 54 | " (151) | " (150) | " | ethyleneglycol diacetate (17.5) | " | " | 20 | 0.99 | 216 | 54 |
| 55 | " (151) | " (150) | " | caprolactone (17.5) | " | " | 20 | 1.36 | 163 | 56 |
| 56 | " (151) | " (150) | " | benzyl carbonate (17.5) | " | " | 20 | 1.21 | 197 | 54 |
| 57 | " (151) | " (150) | " | succinic anhydride (17.5) | " | " | 20 | 1.24 | 177 | 56 |
| 58 | " (151) | " (150) | " | phthalic anhydride (17.5) | " | " | 20 | 1.26 | 184 | 55 |
| 59 | " (151) | " (150) | " | acetonitrile (35) | " | " | 20 | 1.30 | 165 | 56 |
| 60 | " (151) | " (150) | " | glutaronitrile (35) | " | " | 20 | 1.27 | 172 | 56 |
| 61 | " (151) | " (150) | " | trimethyl amine (35) | " | " | 20 | 1.34 | 158 | 57 |
| 62 | " (151) | " (150) | " | tetramethyl ethylene diamine (17.5) | " | " | 20 | 1.26 | 173 | 57 |
| 63 | vinyl acetate (151) | methyl acrylate (150) | C$_2$H$_5$AlCl$_2$ (17.5) | dimethyl acetamide (17.5) | t-butyl peroxy isopropyl carbonate | n-hexane (1065) | 20 | 1.08 | 195 | 55 |
| 64 | " (151) | " (150) | " | diethyl thioether (35) | " | " | 20 | 1.35 | 151 | 58 |
| 65 | " (151) | " (150) | " | dibutyl thioether (35) | " | " | 20 | 1.32 | 154 | 57 |
| 66 | " (151) | " (150) | " | ethyl benzoate (35) | acetyl peroxide | " | 20 | 0.80 | 232 | 51 |
| 67 | " (151) | " (150) | " | " | lauroyl peroxide | " | 20 | 0.97 | 218 | 52 |
| 68 | " (151) | " (150) | " | " | 2,4-dichloro benzoyl peroxide | " | 20 | 1.47 | 174 | 55 |
| 69 | " (151) | " (150) | " | " | diisopropyl peroxy dicarbonate | " | 20 | 0.82 | 230 | 51 |
| 70 | " (151) | " (150) | " | " | t-butyl peroxy acetate | " | 20 | 1.04 | 211 | 53 |
| 71 | " (151) | " (150) | " | " | t-butyl peroxy ethyl hexanoate | " | 20 | 0.99 | 216 | 54 |
| 72 | " (151) | " (150) | " | " | t-butyl peroxy benzoate | " | 20 | 1.24 | 194 | 55 |
| 73 | vinyl acetate (151) | ethyl acrylate (175) | C$_2$H$_5$AlCl$_2$ (17.5) | methyl benzoate (35) | t-butyl peroxy benzoate | n-hexane (1065) | 10 | 0.96 | 248 | 51 |
| 74 | " (151) | methyl methacrylate (175) | " | ethyl ether (35) | " | " | 30 | 1.05 | 228 | 51 |
| 75 | allyl acetate (176) | methyl acrylate (150) | " | " | " | " | 20 | 1.72 | 166 | 59 |
| 76 | ethyl | " | " | γ-butyro- | " | " | 0 | 1.31 | 175 | 53 |

Table 2-continued

| Example | Monomers monomer (a) (g) | Monomers monomer (b) (g) | Catalyst component (A) organoaluminum halide (i) (m mol) | Catalyst component (A) organic polar compound (m mol) | Catalyst component (B) organic peroxide | Solvent (ml) | Copolymerization conditions Temp. (°C) | Copolymerization conditions monomer concentration (mol/l-solvent) | Yield (g) | Copolymer formed content of monomer (b) (mol %) |
|---|---|---|---|---|---|---|---|---|---|---|
| | vinyl ether (127) | (150) | | lactone (35) | | | | | | |
| 77 | isobutyl vinyl ether (176) | " (150) | " | " | " | " | 0 | 1.37 | 199 | 54 |
| 78 | methyl vinyl ether (102) | " (150) | " | n-butyl ether (35) | t-butyl peroxy isopropyl carbonate | " | 0 | 0.84 | 191 | 58 |
| 79 | isobutyl allyl ether (172) | " (150) | " | " | " | " | 20 | 1.85 | 142 | 65 |
| 80 | 1-octadecene (379) | methyl acrylate (129) | " | n-butyl ether (35) | t-butyl peroxy isopropyl carbonate | " | 30 | 1.63 | 233 | 66 |
| 81 | vinyl cyclohexane (193) | methyl acrylate (150) | $C_2H_5AlCl_2$ (17.5) | n-butyl ether (35) | t-butyl peroxy isopropyl carbonate | n-hexane (1065) | 20 | 1.47 | 198 | 60 |
| 82 | cyclopentene (119) | " (150) | " | " | " | " | 20 | 1.88 | 124 | 64 |
| 83 | cyclooctene (193) | " (150) | " | " | " | " | 20 | 1.58 | 188 | 67 |
| 84 | 1,4-pentadiene (119) | " (150) | " | " | " | " | 20 | 1.41 | 160 | 58 |
| 85 | 2,4-dimethyl-4-vinyl-1-cyclohexane (238) | " (150) | " | " | " | " | 20 | 1.85 | 162 | 70 |
| 86 | 2-phenyl-1,3-hexadiene (228) | " (150) | " | " | " | " | 20 | 1.92 | 170 | 53 |
| 87 | chlorostyrene (243) | " (150) | " | " | " | " | 20 | 1.69 | 204 | 51 |
| 88 | vinyl formate (126) | " (150) | " | " | " | " | 20 | 1.05 | 195 | 55 |
| 89 | allyl benzoate (284) | " (150) | " | ditto | " | " | 20 | 1.43 | 257 | 61 |
| 90 | α-methyl styrene (177) | octadecyl acrylate (482) | $C_2H_5AlCl_2$ (17.5) | n-butyl ether (35) | t-butyl peroxy isopropyl carbonate | n-hexane (1065) | 30 | 1.64 | 275 | 52 |
| 91 | " | benzyl acrylate (243) | " | " | " | " | 30 | 1.42 | 220 | 53 |
| 92 | " | cyclohexyl acrylate (231) | " | " | " | " | 30 | 1.05 | 265 | 51 |
| 93 | " | 2-chloroethyl acrylate (202) | " | " | " | " | 30 | 1.08 | 243 | 53 |
| 94 | styrene (183) | ethyl α-ethyl acrylate (224) | " | " | " | " | 30 | 1.88 | 198 | 51 |
| 95 | " | methyl atropate (283) | " | " | " | " | 30 | 2.03 | 155 | 56 |
| 96 | " | methyl α-chloroacrylate (235) | " | " | " | " | 30 | 2.09 | 145 | 55 |
| 97 | " | methacrylonitrile (117) | " | " | " | " | 30 | 2.17 | 1.04 | 51 |
| 98 | " | vinylidene cyanide (136) | " | " | " | " | 30 | 2.05 | 123 | 51 |

Table 2-continued

| | Monomers | | Catalyst component (A) | | Catalyst component (B) | Solvent (ml) | Copolymerization conditions | | Copolymer formed |
|---|---|---|---|---|---|---|---|---|---|
| Example | monomer (a) (g) | monomer (b) (g) | organoaluminum halide (i) (m mol) | organic polar compound (m mol) | organic peroxide | | Temp. (°C.) | monomer concentration (mol/l-solvent) | Yield (g) / content of monomer (b) (mol %) |

| Example | monomer (a) (g) | monomer (b) (g) | organoaluminum halide (i) (m mol) | organic polar compound (m mol) | organic peroxide | Solvent (ml) | Temp. (°C.) | monomer conc. (mol/l) | Yield (g) | content of monomer (b) (mol %) |
|---|---|---|---|---|---|---|---|---|---|---|
| 99 | " | methyl vinyl ketone (123) | " | " | " | " | 20 | 1.41 | 183 | 54 |
| 100 | styrene (183) | phenyl vinyl ketone (231) | C₂H₅AlCl₂ (17.5) | n-butyl ether (35) | t-butyl peroxy isopropyl carbonate | n-hexane (1065) | 20 | 1.95 | 166 | 56 |
| 101 | vinyl acetate (151) | N-butyl acrylamide (222) | " | " | " | " | 20 | 1.88 | 171 | 62 |
| 102 | " | NN' dimethyl acrylamide (173) | " | " | " | " | 20 | 1.98 | 136 | 60 |
| 103 | " | N,N-dimethyl methacrylamide (198) | " | " | " | " | 20 | 1.95 | 154 | 65 |
| 104 | " | methyl acrylate (150) | " | methyl benzoate (35) | " | methyl cyclohexane (1065) | 20 | 0.85 | 233 | 50 |
| 105 | " | " | " | " | " | n-decane (1065) | 20 | 0.88 | 229 | 50 |
| 106 | " | " | " | " | " | kerosene (1065) | 20 | 0.97 | 217 | 51 |
| 107 | styrene (183) | " (150) | " | methyl methacrylate (35) | t-butyl peroxy isobutyrate | " | 20 | 1.79 | 163 | 52 |
| 108 | " (183) | " (150) | " | vinyl acetate (35) | " | " | 20 | 1.87 | 155 | 51 |
| 109 | " (182) | methyl methacrylate (175) | " | methyl acrylate (35) | " | " | 20 | 2.13 | 139 | 57 |
| 110 | α-methyl styrene (207) | methyl acrylate (150) | (C₂H₅)₂AlCl (17.5) | methyl methacrylate (35) | t-butyl peroxy isopropyl carbonate | " | 30 | 2.06 | 146 | 53 |
| 111 | " (207) | " (150) | C₂H₅AlCl₂ (17.5) | " | dipropionyl peroxide | methyl cyclohexane (1065) | 30 | 1.99 | 154 | 53 |
| 112 | " (207) | " (150) | " | methyl allyl ether (35) | t-butyl peroxy isopropyl carbonate | n-hexane (1065) | 30 | 2.22 | 130 | 53 |
| 113 | " (207) | " (150) | " | vinyl acetate (35) | " | " | 30 | 1.98 | 155 | 54 |
| 114 | 4-methyl-1-pentene (148) | " (150) | " | methyl methacrylate (35) | t-butyl peroxy isobutyrate | " | 10 | 1.97 | 96 | 66 |
| 115 | isoprene (120) | " (150) | " | " | " | " | 10 | 2.02 | " | 54 *1 |
| 116 | vinyl acetate (151) | ditto (150) | " | " | t-butyl peroxy isopropyl carbonate | " | 20 | 1.85 | 133 *2 | 67 |
| 117 | isobutyl vinyl ether (176) | " (150) | " | " | t-butyl peroxy isobutyrate | " | 10 | 1.54 | 183 | 59 |
| 118 | styrene (183) | " (150) | " | methyl acrylate (35) | " | " | 20 | 1.70 | 171 | 54 |
| 119 | styrene (182) | methyl methacrylate (175) | " | methyl methacrylate (35) | " | " | 20 | 1.90 | 126 | 54 |
| 120 | " (207) | acrylonitrile (93) | " | acrylonitrile (35) | " | " | 20 | 2.24 | 52 | 56 |
| 121 | α-methyl styrene (207) | methyl acrylate (150) | " | methyl acrylate (35) | t-butyl peroxy isopropyl | " | 30 | 1.70 | 184 | 55 |

Table 2-continued

| Example | Monomers monomer (a) (g) | Monomers monomer (b) (g) | Catalyst component (A) organoaluminum halide (i) (m mol) | Catalyst component (A) organic polar compound (m mol) | Catalyst component (B) organic peroxide | Solvent (ml) | Copolymerization conditions Temp. (° C.) | Copolymerization conditions monomer concentration (mol/l-solvent) | Yield (g) | Copolymer formed content of monomer (b) (mol %) |
|---|---|---|---|---|---|---|---|---|---|---|
| 122 | " (207) | " (150) | $(C_2H_5)_2AlCl$ (17.5) | " | carbonate " | " | 30 | 1.83 | 170 | 54 |
| 123 | " (207) | " (150) | $C_2H_5AlCl_2$ (17.5) | " | dipropionyl peroxide *3 | methyl cyclohexane (1065) | 30 | 1.59 | 195 | 54 |
| 124 | 4-methyl-1-pentene (148) | " (150) | " | " | t-butyl peroxy isobutyrate | n-hexane (1065) | 10 | 1.98 | 103 | 68 |
| 125 | isoprene (120) | " (150) | " | " | " | " | 10 | 2.10 | 77 | 53 *1 |
| 126 | vinylidne (170) | " (150) | " | " | " | " | 10 | 1.89 | 128 | 66 |
| 127 | vinyl acetate (151) | " (150) | " | vinyl acetate (35) | t-butyl peroxy isopropyl carbonate | " | 20 | 1.44 | 173 | 57 |
| 128 | isobutyl vinyl ether (176) | " (150) | " | methyl acrylate (35) | t-butyl peroxy isobutyrate | " | 10 | 1.95 | 145 | 67 |
| 129 | styrene (91) vinyl acetate (75) | " (150) | " | methyl benzoate (35) | t-butyl peroxy isopropyl carbonate | " | 20 | 1.00 | 226 | styrene; 20 vinyl acetate; 27 methyl acrylate; 53 |
| 130 | α-methyl styrene (207) | methyl acrylate (75) ethyl acrylate (88) | " | n-butyl ether (35) | t-butyl peroxy isobutyrate | " | 20 | 0.86 | 284 | α-methyl styrene; 50 methyl acrylate; 27 ethyl acrylate; 23 |

*1-By elemental analysis
*2-Soluble in acetone, etrahydrofuran and chloroform; no gel content
*3-Used in an amount of 8.8 millimoles without being made into a solution.

EXAMPLE 131

In the polymerization flask used in Example 1, a third metering pump was connected to the sixth neck which had been stopped. The flask was then disposed in a constant-temperature tank, and its inside was thoroughly purged with nitrogen. 765 ml of n-hexane was fed into the flask, and the temperature of the system was lowered to 10° C. While maintaining this temperature, 298.0 g of an equimolar mixture of 4-methyl-1-pentene and methyl acrylate, 300 ml of a 0.03 mole/liter n-hexane solution of tertbutylperoxy isobutyrate, and 300 ml of a mixed solution (which was prepared by mixing 150 ml of a 0.24 mole/liter n-hexane solution of ethyl acetate and a 0.12 mole/liter n-hexane solution of ethylaluminum dichloride at 0° C and then allowing the mixture to stand for 1 hour in order to complete the formation of a complex between them) were fed with stirring at constant rates for 5 hours using the three metering pumps so that the total concentration of the two monomers became not more than 2.5 moles per liter of the solvent.

Soon after the feeding of the monomers began, a polymer was seen to form in the reaction system, and the state of the system during the polymerization was almost the same as in Example 1. The polymerization was continued for an additional 15 hours at 10° C after the end of feeding the monomers. The polymer could be readily recovered by the same operation as in Example 1. There was obtained 147 g of 4-methyl-1-pentene/-methyl acrylate copolymer having a methyl acrylate content of 57 mole%. Analysis by gel permeation chromatography showed that the molecular weight distribution of the copolymer was within the range of 40,000 to 500,000.

EXAMPLES 132 TO 135

The procedure of Example 131 was repeated except that the types of the monomer (a), the organic polar compound in catalyst component (A) and the organic peroxide as catalyst component (B) were changed as shown in Table 3. The results are shown in Table 3 together with the results of Example 131.

In each of these examples, the organoaluminum halide was used in an amount of 150 ml as a 0.12 mole/liter n-hexane solution. The organic polar compound was used in an amount of 150 ml as a 0.24 mole/liter n-hexane solution, and the organic peroxide was used in an amount of 300 ml as a 0.03 mole/liter n-hexane solution.

Table 3

| Example | | 131 | 132 | 133 | 134 | 135 |
|---|---|---|---|---|---|---|
| Monomers | monomer (a) (g) | 4-methyl-pentene (148) | α-methyl styrene (207) | styrene (183) | styrene (183) | vinyl acrylate (151) |
| | monomer (b) | methyl | methyl | methyl | methyl | methyl |

Table 3-continued

| Example | | 131 | 132 | 133 | 134 | 135 |
|---|---|---|---|---|---|---|
| Catalyst Component (A) | (g) organoaluminum halide (i) | acrylate (150) C$_2$H$_5$AlCl$_2$ | acrylate (150) C$_2$H$_5$AlCl$_2$ | acrylate (150) C$_2$H$_5$AlCl$_2$ | acrylate (150) C$_2$H$_5$AlCl$_2$ | acrylate (150) C$_2$H$_5$AlCl$_2$ |
| | organic polar compound | ethyl acetate | n-butyl ether | methyl methacrylate | methyl acrylate | methyl benzoate |
| Catalyst component (B) | organic peroxide | t-butyl peroxy iso-butyrate | t-butyl peroxy iso-butyrate | t-butyl peroxy iso-butyrate | t-butyl peroxy iso-butyrate | t-butyl peroxy isopropyl carbonate |
| Solvent (ml) | | n-hexane (765) | n-hexane (765) | n-hexane (765) | n-hexane (765) | n-hexane (765) |
| Copolymerization conditions | temperature (° C.) | 10 | 30 | 20 | 20 | 20 |
| | monomer concentration (mol/l-solvent) | 2.12 | 1.16 | 2.26 | 2.15 | 2.18 |
| Copolymer formed | yield (g) | 147 | 262 | 134 | 149 | 220 |
| | content of (mol %) | | | | | |
| | molecular weight distribution ($\times 10^4$) | 4 – 50 | 4 – 40 | — | — | 4 – 50 |

EXAMPLE 136

A gas flow meter was connected to the sixth neck of the polymerization flask used in Example 1 which had been stopped. The flask was similarly disposed in a constant-temperature tank, and its inside was thoroughly purged with nitrogen. The flask was then charged with 1065 ml of n-hexane and 35 ml of ethyl acetate, which were then cooled to 0° C. To the solution was added dropwise 17.5 millimoles of ethylaluminum dichloride with stirring over the course of about 5 minutes. The mixture was allowed to stand for about 1 hour with stirring. The mixture was heated to 10° C, and at this temperature, 151 g of methyl acrylate and 300 ml of a 0.03 mole/liter n-hexane solution of tert-butylperoxy isobutyrate were fed with stirring through the two metering pump, and 109 g of vinyl chloride was fed from the gas flow meter, both for 5 hours at constant rates. The copolymerization proceeded in almost the same behavior as in Example 1. After the polymerization, 178 g of a vinyl chloride/methyl acrylate copolymer could be recovered by a simple operation. Elemental analysis showed that the copolymer had a methyl acrylate content of 53 mole%.

EXAMPLES 137 TO 143

The procedure of Example 136 was repeated except that the types and amounts of monomers (a) and (b), and the type and amount of the organic polar compound in catalyst component (A) were changed as shown in Table 4. The results are shown in Table 4 together with the results of Example 136.

In Examples 142 and 143, the rate of feeding monomers into the reactor was increased to maintain the total concentration of the monomers in the reactor at 5 to 6 moles per liter of the solvent. In either case, the copolymer particles agglomerated and adhered to one another and to the reactor walls, and the stirring of the system became difficult. Since it was judged that further performance of the copolymerization would accelerate the adhesion of the copolymer to the reactor wall and make it difficult to recover the copolymer from the reactor, the polymerization was stopped one hour after its initiation. Thus, the monomer concentration in the reaction system in these examples was determined at one hour after the initiation of polymerization.

Table 4

| Example | | 136 | 137 | 138 | 139 | 140 | 141 | 142 | 143 |
|---|---|---|---|---|---|---|---|---|---|
| Monomers | monomer (a) (g) | vinyl chloride (109) | vinyl chloride (109) | vinyl chloride (109) | propylene (74) | butadiene (81) | 1-butene (98) | α-methyl styrene (414) | vinyl acetate (301) |
| | monomer (a) (g) | methyl acrylate (151) | methyl acrylate (151) | methyl acrylate (151) | methyl acrylate (151) | methyl acrylate (151) | methyl acrylate (151) | methyl acrylate (151) | methyl acrylate (151) |
| Catalyst component (A) | organoaluminum halide (i) (m mol) | C$_2$H$_5$AlCl$_2$ (17.5) | C$_2$H$_5$AlCl$_2$ (17.5) | C$_2$H$_5$AlCl$_2$ (17.5) | C$_2$H$_5$AlCl$_2$ (17.5) | C$_2$H$_5$AlCl$_2$ (17.5) | C$_2$H$_5$AlCl$_2$ (17.5) | C$_2$H$_5$AlCl$_2$ (17.5) | C$_2$H$_5$AlCl$_2$ (17.5) |
| | organic polar compound (ml) | ethyl acetate (35) | methyl methacrylate (35) | methyl acrylate (35) | n-butyl ether (35) | γ-butyrolactone (17.5) | n-butyl ether (35) | n-butyl ether (35) | methyl benzoate (35) |
| Catalyst component (B) | organic peroxide | t-butyl peroxy iso-butyrate | t-butyl peroxy iso-butyrate | t-butyl peroxy iso-butyrate | t-butyl peroxy isopropyl carbonate | t-butyl peroxy isopropyl carbonate | t-butyl peroxy isopropyl carbonate | t-butyl peroxy isopropyl carbonate | t-butyl peroxy isopropyl carbonate |
| Solvent (ml) | | n-hexane (1065) | n-hexane (1065) | n-hexane (1065) | n-hexane (1065) | n-hexane (1065) | n-hexane (1065) | n-hexane (1065) | n-hexane (1065) |
| Copolymerization conditions | Temp. (° C.) | 10 | 10 | 10 | 0 | 0 | 0 | 30 | 20 |
| | monomer concentration | 1.11 | 1.85 | 1.80 | 1.57 | 1.63 | 1.41 | 5.12 | 5.12 |

Table 4-continued

| Example | | 136 | 137 | 138 | 139 | 140 | 141 | 142 | 143 |
|---|---|---|---|---|---|---|---|---|---|
| Copolymer formed | (mol/l-solvent) Yield (g) | 178 | 101 | 103 | 97 | 116 | 135 | 121 | 103 |
| | content of monomer (b) (mol %) | 53 *1 | 65 | 68 | 63 | 51 | 61 | 56 | 58 |

*1 - By elemental analysis

EXAMPLE 144

The inside of the same flask as used in Example 1 was thoroughly purged with nitrogen, and the flask was charged with 1065 ml of n-hexane and 17.5 millimoles of ethylaluminum dichloride. The temperature of the solution was maintained at 20° C. At this temperature, 301 g of an equimolar mixture of vinyl acetate and methyl acrylate and 300 ml of a 0.03 mole/liter n-hexane solution of tertbutylperoxy isopropyl carbonate were fed continuously with stirring for 5 hours at constant rates using the two metering pumps. In this case, the copolymerization proceeded with almost the same behavior as in Example 1. The same operation as in Example 1 gave 167 g of a vinyl acetate/methyl acrylate copolymer. By NMR spectroscopy, the copolymer was found to have a methyl acrylate content of 60 mole%.

COMPARATIVE EXAMPLE 2

In the 2-liter six-necked separable flask used in Example 1, the two necks connected to the metering pump were sealed by stopper cocks, and the flask equipped only with the stirring rod, condenser and thermometer was disposed similarly in a constant-temperature tank. The inside of the flask was thoroughly purged with nitrogen. 1365 ml of n-hexane and 35 millimoles of ethyl acetate were fed into the flask in an atmosphere of nitrogen, mixed and cooled to 0° C. To the solution was slowly added dropwise 17.5 millimoles of ethylaluminum dichloride with stirring over the course of about 5 hours. After the addition, the mixture was allowed to stand for 1 hour. The mixture was then heated to 10° C, and 298.0 g of an equimolar mixture of 4-methyl-1-pentene and methyl acrylate and 8.8 millimoles of tert-butylperoxy isobutyrate were added at a time in this sequence. When tert-butylperoxy isobutyrate was added, the precipitation of a polymer was soon seen to take place in the reaction system. The polymer did not form in the dispersed and afloat state, but deposited on the well and bottom of the polymerization flask and on the stirring rod and gradually increased in quantity.

The polymerization was performed for 20 hours at 10° C with stirring, but as a result of precipitation and adhesion of the polymer, it was difficult to continue uniform stirring, and the reaction system assumed a precipitation polymerization system. After the end of the polymerization, 200 ml of a 10% by volume n-hexane solution of isopropyl alcohol was added to the reaction mixture to decompose the catalyst. The resulting copolymer was withdrawn from the flask with considerable difficulty because it firmly adhered to the reactor wall as an agglomerated mass. The polymer withdrawn was sufficiently washed with n-hexane, and dried at 30° C under reduced pressure. The amount of the 4-methyl-1-pentene/methyl acrylate obtained was 83 g. and its methyl acrylate content determined from the NMR spectrum of the copolymer was 74 mole%. The content of methyl acrylate was far larger than in the copolymer obtained in Example 1, and this fact demonstrated that the composition of the resulting copolymer was near that of a copolymer obtained by free radical polymerization.

The molecular weight distribution of the copolymer, determined by gel permeation chromatography, was within the range of 10,000 to 1,000,000, and was broader than those of the copolymers obtained by the continuous feeding method in Example 1.

COMARATIVE EXAMPLES 3 TO 12

The procedure of Comparative Example 2 was repeated, and the results are shown in Table 5 together with the results of Comparative Example 2.

It was found that in any of these Comparative Examples, the resulting copolymer stuck firm to the stirring rod and the inside of the flask, and the reaction system could not be stirred uniformly.

Table 5

| | Comparative Example | 2 | 3 | 4 | 5 | 6 | 7 |
|---|---|---|---|---|---|---|---|
| Monomer | monomer (a) | 4-methyl-1-pentene | α-methyl styrene | 4-methyl-1-pentene | styreye | styrene | styrene |
| | monomer (b) | methyl acrylate | methyl acrylate | methyl acrylate | methyl acrylate | methyl acrylate | methyl methacrylate |
| | amount of an equimolar mixture of the monomers (g) | 298 | 357 | 301 | 333 | 333 | 357 |
| | Organic polar compound used in catalyst component (A) (m mol) | ethyl acetate (35) | n-butyl ether (35) | methyl benzoate (35) | methyl methacrylate (35) | vinyl acetate (35) | methyl acrylate (35) |
| | Catalyst compound (B) organic peroxide (m mol) | t-butyl peroxy isobutyrate (8.8) | t-butyl peroxy isobutyrate (8.8) | t-butyl peroxy isopropyl carbonate (8.8) | t-butyl peroxy isobutyrate (8.8) | t-butyl peroxy isobutyrate (8.8) | t-butyl peroxy isobutyrate (8.8) |
| Copolymerization conditions | temperature (° C.) | 10 | 30 | 20 | 20 | 20 | 20 |
| | Time (hrs.) | 20 | 20 | 20 | 7 | 7 | 7 |
| | Yield (g) | 83 | 173 | 138 | 36 | 69 | 31 |
| Copolymer formed | content of monomer (b) (mol%) | 74 | 51 | 58 | 57 | 54 | 52 |
| | molecular weight distribution ($\times 10^4$) | 1 - 100 | 2 - 100 | 1 - 100 | — | — | — |
| | Comparative Example | 8 | 9 | 10 | 11 | 12 | |

Table 5-continued

| | monomer (a) | vinyl acetate | styrene | styrene | α-methyl styrene | vinyl acetate |
|---|---|---|---|---|---|---|
| Monomer | monomer (b) | methyl acrylate | methyl acrylate | methyl methacrylate | methyl acrylate | methyl acrylate |
| | amount of the equimolar mixture of the monomers (g) | 301 | 333 | 357 | 357 | 301 |
| | Organic polar compound used in catalyst component (A) (m mol) | methyl methacrylate (35) | methyl acrylate (35) | methyl methacrylate (35) | methyl acrylate (35) | methyl acrylate (35) |
| | Catalyst component (B) organic peroxide (m mol) | t-butyl peroxy isopropyl carbonate (8.8) | t-butyl peroxy isobutyrate (8.8) | t-butyl peroxy isobutyrate (8.8) | t-butyl peroxy isopropyl carbonate (8.8) | t-butyl peroxy isopropyl carbonate (8.8) |
| Copolymerization conditions | temperature (° C.) | 20 | 20 | 20 | 30 | 20 |
| | Time (hrs.) | 7 | 7 | 7 | 7 | 7 |
| | Yield (g) | 88 | 38 | 29 | 97 | 85 |
| Copolymer formed | content of monomer (g) (mol %) | 66 | 57 | 55 | 56 | 67 |
| | molecular weight distribution ($\times 10^4$) | — | — | — | — | 3 – 150 |

| Comparative Example | Remarks |
|---|---|
| 2 | Precipitation polymerization; uniform stirring became impossible during the copolymerization reaction |
| 3 | Finally the increased amount of the copolymer stuck to the stirring rod and the bottom of the flask to cause a failure of further stirring; the copolymer was withdrawn after being dissolved in chloroform |
| 4 | " |
| 5 | Precipitation polymerization; uniform stirring was impossible. the increase in the amount of the copolymer was very slow. |
| 6 | " |
| 7 | " |
| 8 | " |
| 9 | " |
| 10 | " |
| 11 | "; the copolymer was withdrawn from the flask after being dissolved in chloroform, and poured into methanol to reprecipitate and recover the copolymer |
| 12 | The copolymer did not form in the form of granules of uniform size, but from the outset of polymerization, stuck to the stirring rod and the inside of the flask; stirring could not be continued to the end of the polymerization; the copolymer was partially insoluble in tetrahydrofuran. |

What we claim is:

1. A process for preparing copolymers which comprises copolymerizing (a) at least one monomer selected from the group consisting of monoolefins, non-conjugated polyenes, conjugated polyenes, haloolefins, unsaturated esters of carboxylic acids and unsaturated ethers with (b) an acrylic monomer of the following formula

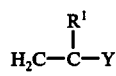

wherein $R^1$ is a member selected from the group consisting of a hydrogen atom, a halogen atom, a cyanide group, alkyl groups and aryl groups, and Y is a member selected from the group consisting of —CN, —COR², —COOR³ and —CONR⁴R⁵ in which each of R², R⁴ and R⁵ is a hydrogen atom, or an alkyl, aryl or cycloalkyl group, and R³ is an alkyl, aryl or cycloalkyl group or a monovalent metal, at a molar ratio of monomer (a) to monomer (b) of 1: to about 0.2 - 5, at a temperature ranging from about 0° C. to a point about 10° C. higher than the glass transition point of the resulting copolymer, with stirring, in the presence of a catalyst composed of (A) a component selected from the group consisting of (i) organoaluminum halides of the following formula

wherein $R^6$ is an alkyl, alkenyl, aryl, aralkyl or cycloalkyl group, X is a halogen atom, and n is a number of more than 0 but less than 3, and (ii) complexes formed between said halides (i) and organic polar compounds, and (B) an organic peroxide, in a poor solvent of a saturated hydrocarbon for the resulting copolymer, the amount of the poor solvent being about 0.5 to about 100 times the total amount of the monomers (a) and (b), wherein the copolymerization reaction is preformed while, (I) adding the monomers (a) and (b) to the reaction system so that the total amount of the monomers (a) and (b) remaining unreacted in the reaction system is sufficient to maintain the system in the slurried state under the reaction conditions wherein said monomers unreacted are not more than about 2.5 moles per liter of the poor solvent used, and (II) adding small portions of either one or both of the catalyst components (A) and (B) continuously or intermittently to the reaction system with the proviso that when only one of the catalyst components is added in small portions to the reaction system, the other catalyst component is added in its entirety to the reaction system before feeding the small portions of the other catalyst component, (III) the amount of the catalyst component (A) being about 1/1,000,000 to about 1 mole, calculated as the organoaluminum halide (i) per mole of the monomers (a) and (b) combined and the amount of the catalyst component (B) being about 1/100 to about 100 moles per mole of the organoaluminum halide (i) in the catalyst component (A).

2. The process of claim 1 wherein said monomer (a) is selected from the group consisting of aliphatic monoolefins containing 2 to 8 carbon atoms, aromatic monoolefins containing 8 to 13 carbon atoms, conjugated polyenes containing 4 to 12 carbon atoms, unsaturated esters of carboxylic acids containing 3 to 10 carbon atoms, haloolefins containing 3 to 10 carbon atoms and unsaturated ethers containing 3 to 10 carbon atoms.

3. The process of claim 1 wherein the copolymerizaton reaction is carried out while adding the monomers (a) and (b) to the reaction system so that the total amount of these monomers unreacted in the reaction system is not more than about 2.5 moles per liter of the poor solvent thereby to maintain the reaction system in the slurried state under the reaction conditions.

4. A process for preparing copolymers which comprises copolymerizing (a) at least one monomer selected from the group consisting of monoolefins, non-conjugated polyenes, conjugated polyenes, haloolefins, unsaturated esters of carboxylic acids and unsaturated ethers with (b) an acrylic monomer of the following formula

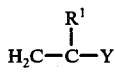

wherein $R^1$ is a member selected from the group consisting of a hydrogen atom, a halogen atom, a cyanide group, alkyl groups and aryl groups, Y is a member selected from the group consisting of $-CN$, $-COR^2$, $-COOR^3$ and $-CONR^4R^5$ in which each of $R^2$, $R^4$ and $R^5$ is a hydrogen atom, or an alkyl, aryl or cycloalkyl group, and $R^3$ is an alkyl, aryl or cycloalkyl group or a monovalent metal, at a molar ratio of monomer (a) to monomer (b) of 1: about 0.2 - 5, at a temperature ranging from about 0° C. to a point about 10° C. higher than the glass transition point of the resulting copolymer, with stirring, in the presence of a catalyst composed of (A) at least one organoaluminum halide of the following formula

wherein $R^6$ is an alkyl, alkenyl, aryl, aralkyl or cycloalkyl group, X is a halogen atom, and n is a number of more than 0 but less that 3, and (B) an organic peroxide, in a poor solvent of a saturated hydrocarbon for the resulting copolymer, the amount of the poor solvent being about 0.5 to about 100 times the total amount of the monomers (a) and (b), wherein the copolymerization reaction is performed while, (I) adding the monomers (a) and (b) to the reaction system so that the total amount of the monomers (a) and (b) remaining unreacted in the reaction system is sufficient to maintain the system in the slurried state under the reaction conditions wherein said monomers unreacted are not more than about 2.5 moles per liter of the poor solvent used, and (II) adding small portions of either one or both of the catalyst components (A) and (B) continuously or intermittently to the reaction system with the proviso that when only one of the catalyst components is added in small portions to the reaction system, the other catalyst component is added in its entirety to the reaction system before feeding the small portions of the other catalyst component, (III) the amount of the catalyst component (A) being about 1/1,000,000 to about 1 mole, calculated as the organoaluminum halide (i) per mole of the monomers (a) and (b) combined and the amount of the catalyst component (B) being about 1/100 to about 100 moles per mole of the organoaluminum halide (i) in the catalyst component (A).

* * * * *